United States Patent [19]

Nakane et al.

[11] Patent Number: 5,283,892
[45] Date of Patent: Feb. 1, 1994

[54] METHOD AND APPARATUS FOR FILE OPERATION

[75] Inventors: Keiichi Nakane; Kazunari Suzuki, both of Yokohama; Toshio Kushida; Junichi Seki, both of Hitachi; Hiroshi Kodaka, Hitachi; Tadashi Kuwabara, Yokohama, all of Japan

[73] Assignees: Hitachi, Ltd., Tokyo; Hitachi Microsoftware Systems, Inc., Yokohama, both of Japan

[21] Appl. No.: 395,016

[22] Filed: Aug. 17, 1989

[30] Foreign Application Priority Data

Aug. 24, 1988 [JP] Japan .................. 63-208421
Aug. 26, 1988 [JP] Japan .................. 63-210765

[51] Int. Cl.⁵ .................................................. G06F 9/40
[52] U.S. Cl. ........................... 395/600; 364/DIG. 1;
364/282.3; 364/283.1; 364/283.3; 364/286.2;
364/948.2
[58] Field of Search ............... 364/DIG. 1, DIG. 2;
395/650, 600

[56] References Cited

U.S. PATENT DOCUMENTS

| | | | |
|---|---|---|---|
| 4,257,096 | 3/1981 | McCullough et al. | 395/650 |
| 4,635,193 | 1/1987 | Moyer et al. | 395/375 |
| 4,642,756 | 2/1987 | Sherrod | 395/650 |
| 4,642,763 | 2/1987 | Cummins | 395/700 |
| 4,888,690 | 12/1989 | Huber | 395/600 |
| 4,914,568 | 4/1990 | Kodosky et al. | 364/200 |
| 4,945,475 | 6/1990 | Bruffey et al. | 364/200 |
| 4,951,190 | 8/1990 | Lane et al. | 364/200 |
| 4,999,766 | 3/1991 | Peters et al. | 395/600 |
| 5,051,898 | 9/1991 | Wright et al. | 364/200 |
| 5,093,779 | 3/1992 | Sakurai | 395/600 |

OTHER PUBLICATIONS

Tony Bove and Cheryl Rhodes, The Well-Connected Macintosh, 1987.
PC Tools Deluxe, The Total Guide to Using PC Tools Deluxe More Effectively, Abacus, 1988, 90, pp. 26-33, 53-61, 67-71, 163-167.

Primary Examiner—Gareth D. Shaw
Assistant Examiner—Lucien Toplu
Attorney, Agent, or Firm—Antonelli, Terry, Stout & Kraus

[57] ABSTRACT

A method and apparatus for file operation comprise a file operation method which enters, prior to the file operation, processing methods for exceptional events which are expected to occur during the file operation, a file operation method which, at the occurrence of an exceptional event during a file operation, holds the file operation, saves information pertinent to the held file into a memory, and inquires the user of the processing method of the held file for the exceptional event, and a file operation method which displays a list of hierarchically organized files at multiple levels so that multiple files can be designated as objects of operations.

20 Claims, 23 Drawing Sheets

FIG. IA
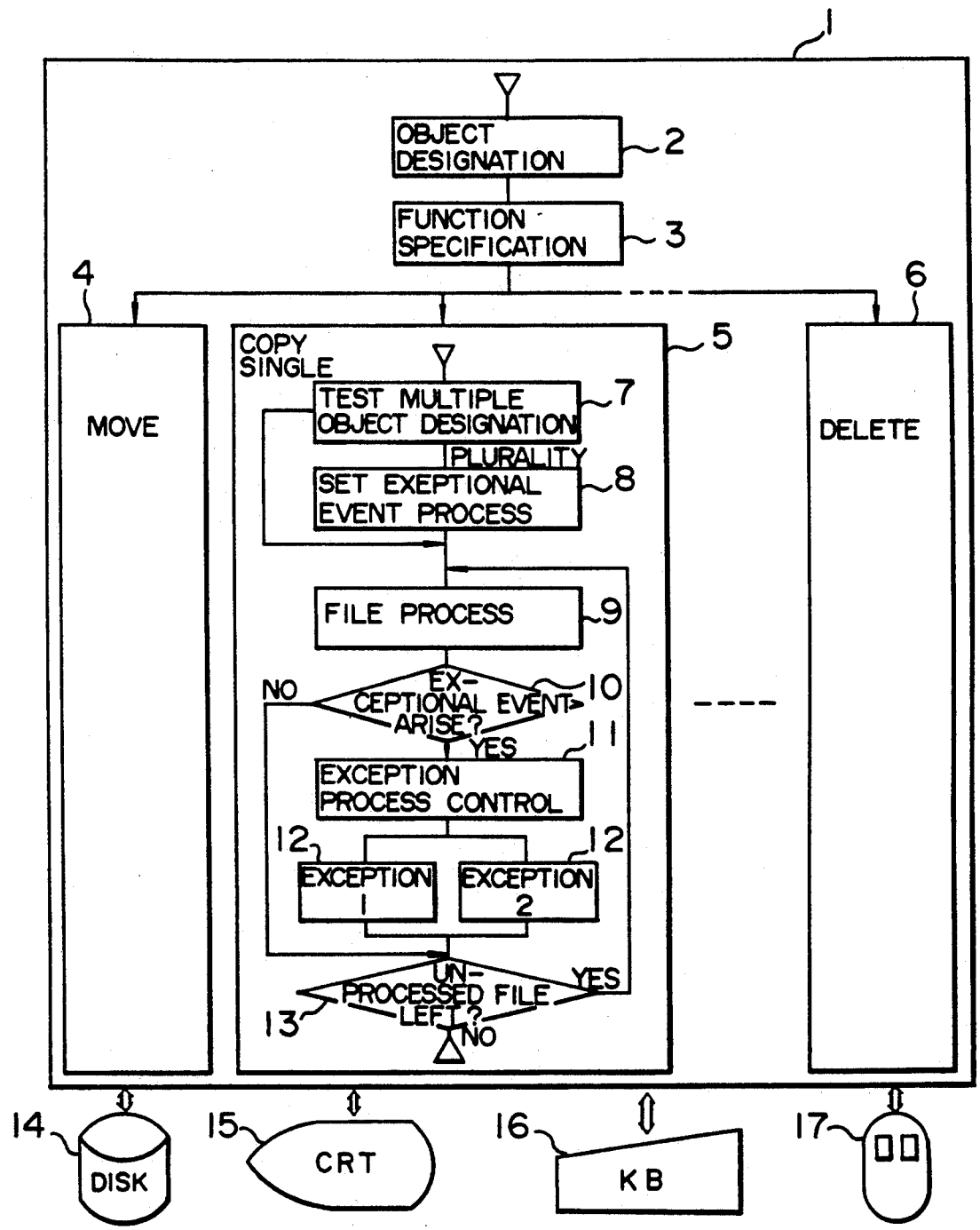

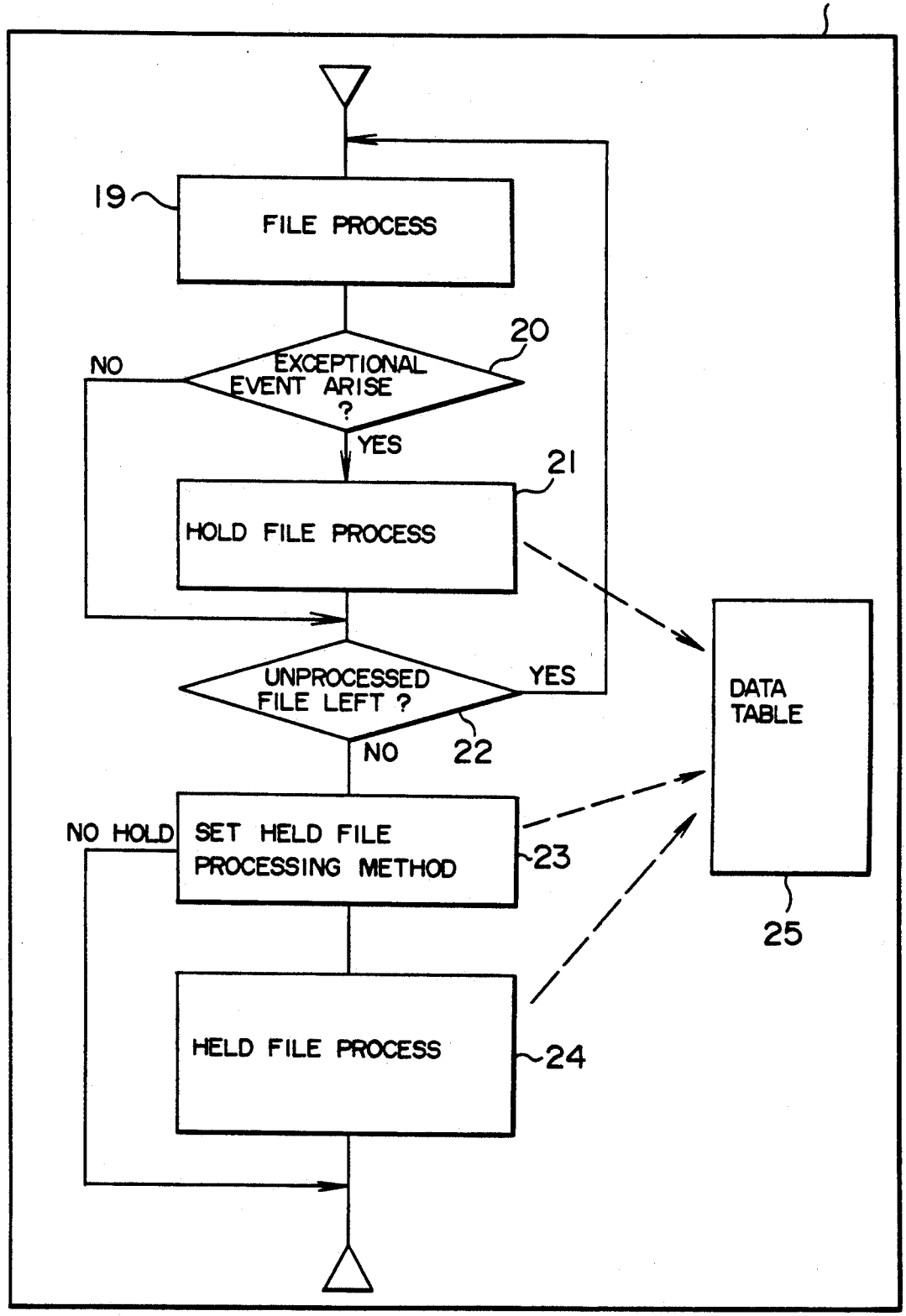

F I G. 6
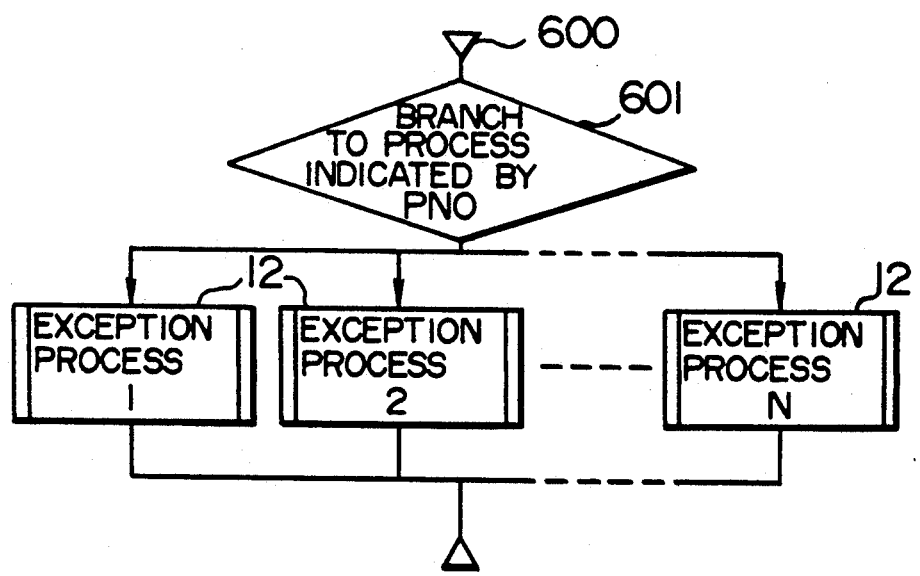

F I G. 9

| | CRS$POS | 0 |
|---|---|---|
| | NUM$D | 11 |
| | HEAD$D | 0 |
| | LAST$D | 10 |

| | N$FILES | 11 |

| | NAME | KIND | LEVEL | APNT |
|---|---|---|---|---|
| FILE$TBL(0) | FLOPPY | OFFH | 0 | 2 |
| FILE$TBL(1) | TEXT 1. DAT | 1 | 1 | 0 |
| FILE$TBL(2) | HOLDER 01. DIR | 10 | 1 | 0 |
| FILE$TBL(3) | TEXT 2. DAT | 1 | 2 | 0 |
| FILE$TBL(4) | HOLDER 02. DIR | 10 | 2 | 0 |
| FILE$TBL(5) | HOLDER 03. DIR | 10 | 3 | 0 |
| FILE$TBL(6) | TEXT 3. DAT | 1 | 3 | 0 |
| FILE$TBL(7) | TEXT 4. DAT | 1 | 3 | 0 |
| FILE$TBL(8) | TEXT 5. DAT | 1 | 2 | 0 |
| FILE$TBL(9) | HOLDER 04. DIR | 10 | 1 | 0 |
| FILE$TBL(10) | DICTIONARY. DIC | 1 | 2 | 0 |
| ⋮ | ⋮ | ⋮ | ⋮ | ⋮ |

SUBROUTINE DISPLAY $ FILES

| | NAME | TYPE |
|---|---|---|
| ROW 0 | →FLOPPY | FLOPPY |
| ROW 1 | TEXT 1. DAT | DATA FILE |
| ROW 2 | HOLDER 01. DIR | DIRECTORY |
| ... | TEXT 2. DAT | DATA FILE |
| ... | HOLDER 02. DIR | DIRECTORY |
| | HOLDER 03. DIR | DIRECTORY |
| | TEXT 3. DAT | DATA FILE |
| | TEXT 4. DAT | DATA FILE |
| | TEXT 5. DAT | DATA FILE |
| | HOLDER 04. DIR | DIRECTORY |
| | DICTIONARY | DATA FILE |

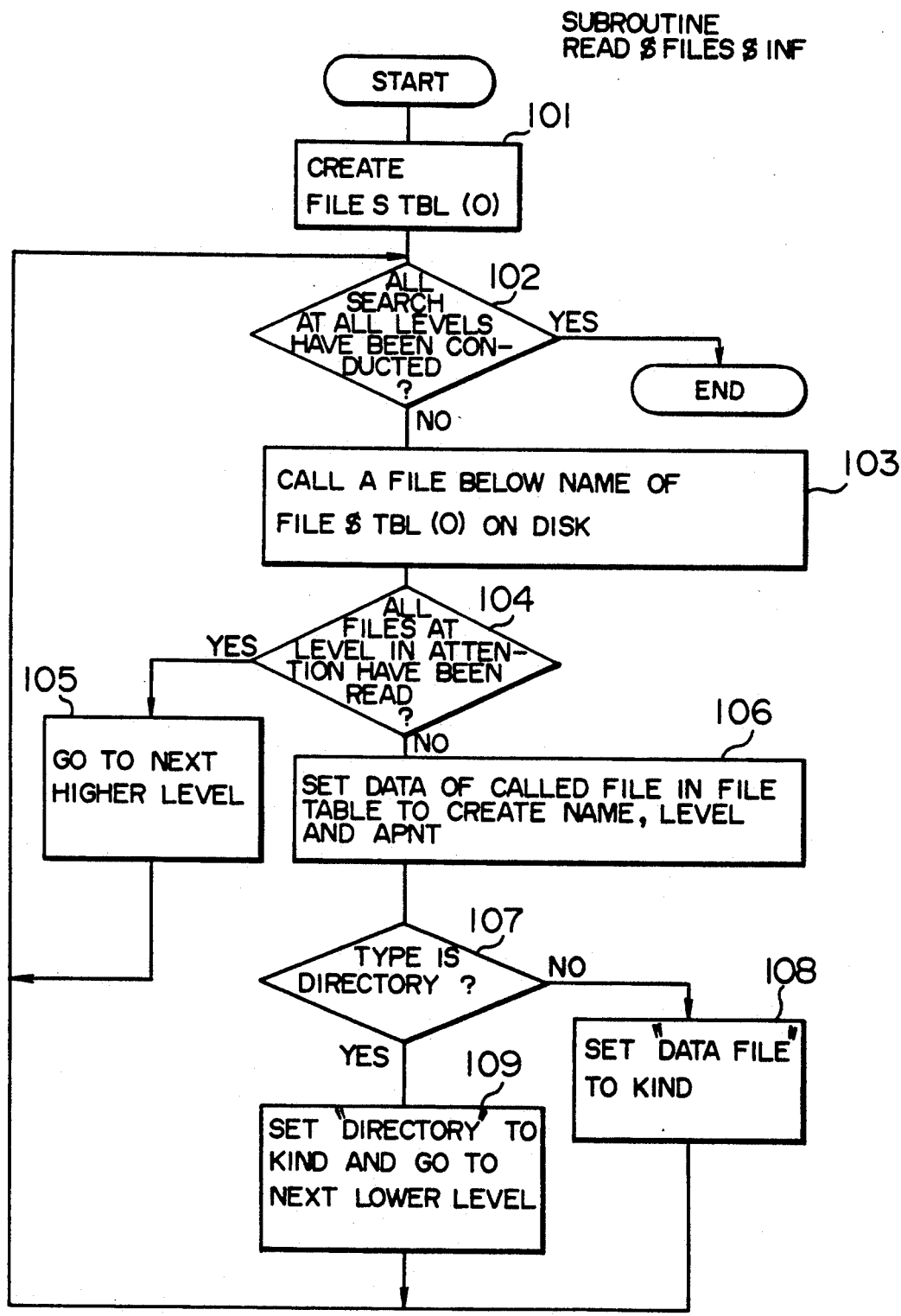

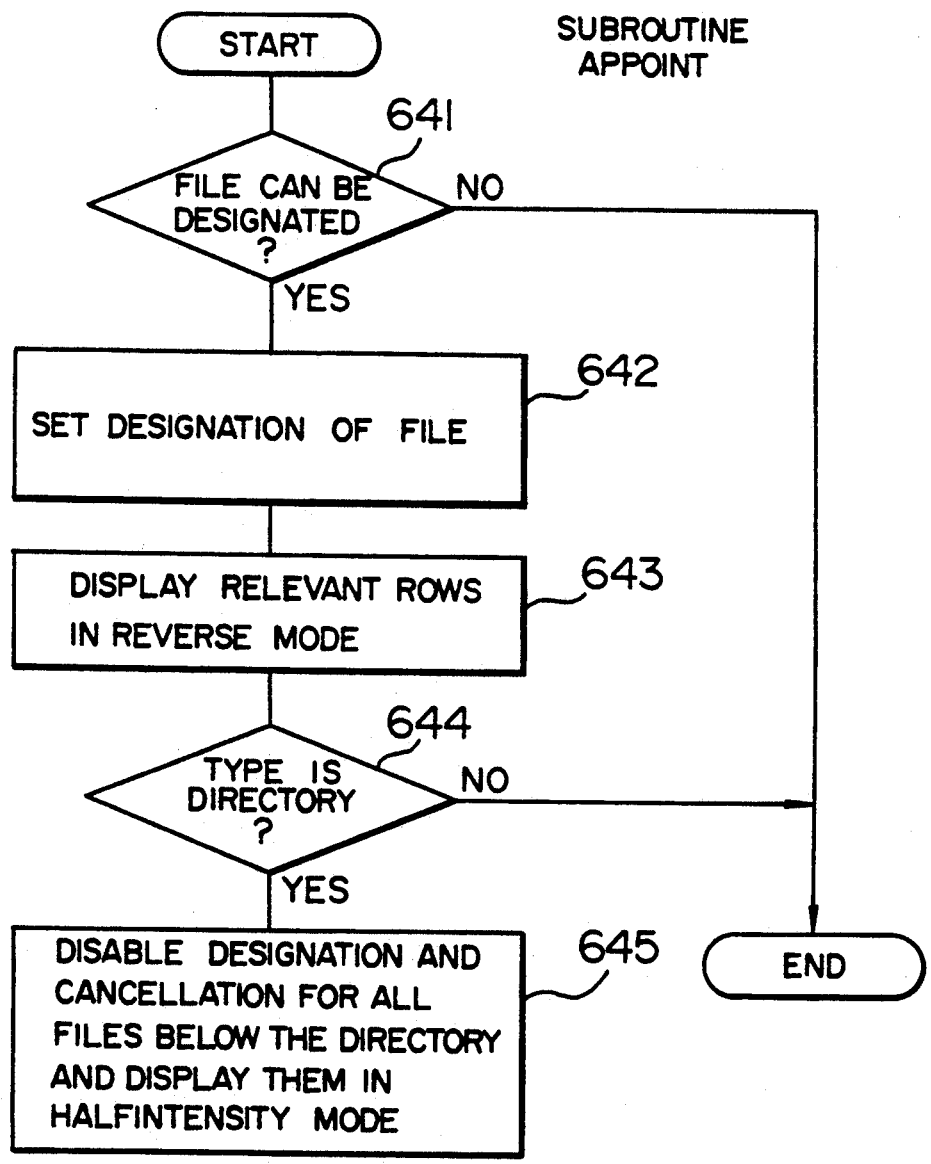

F I G. 19A

| NAME | TYPE | |
|---|---|---|
| FLOPPY | FLOPPY | |
|   TEXT 1. DAT | DATA FILE | |
|   HOLDER 01. DIR | DIRECTORY | |
|   TEXT 2. DAT | DATA FILE | ⎱ 211 |
| → HOLDER 02. DIR | DIRECTORY | |
|     HOLDER 03. DIR | DIRECTORY | |
|     TEXT 3. DAT | DATA FILE | ⎬ 212 |
|     TEXT 4. DAT | DATA FILE | |
|   TEXT 5. DAT | DATA FILE | |
|   HOLDER 04. DIR | DIRECTORY | |
|   DICTIONARY DIC | DATA FILE | ⎱ 213 |

F I G. 19B

| NAME | TYPE |
|---|---|
| FLOPPY | FLOPPY |
|   TEXT 1. DAT | DATAFILE |
|   HOLDER 01. DIR | DIRECTORY |
|   TEXT 2. DAT | DATA FILE |
|     HOLDER 03. DIR | DIRECTORY |
|     TEXT 3. DAT | DATA FILE |
|     TEXT 4. DAT | DATA FILE |
|   TEXT 5. DAT | DATA FILE |
|   HOLDER 04. DIR | DIRECTORY |
| DICTIONARY DIC | DATA FILE |

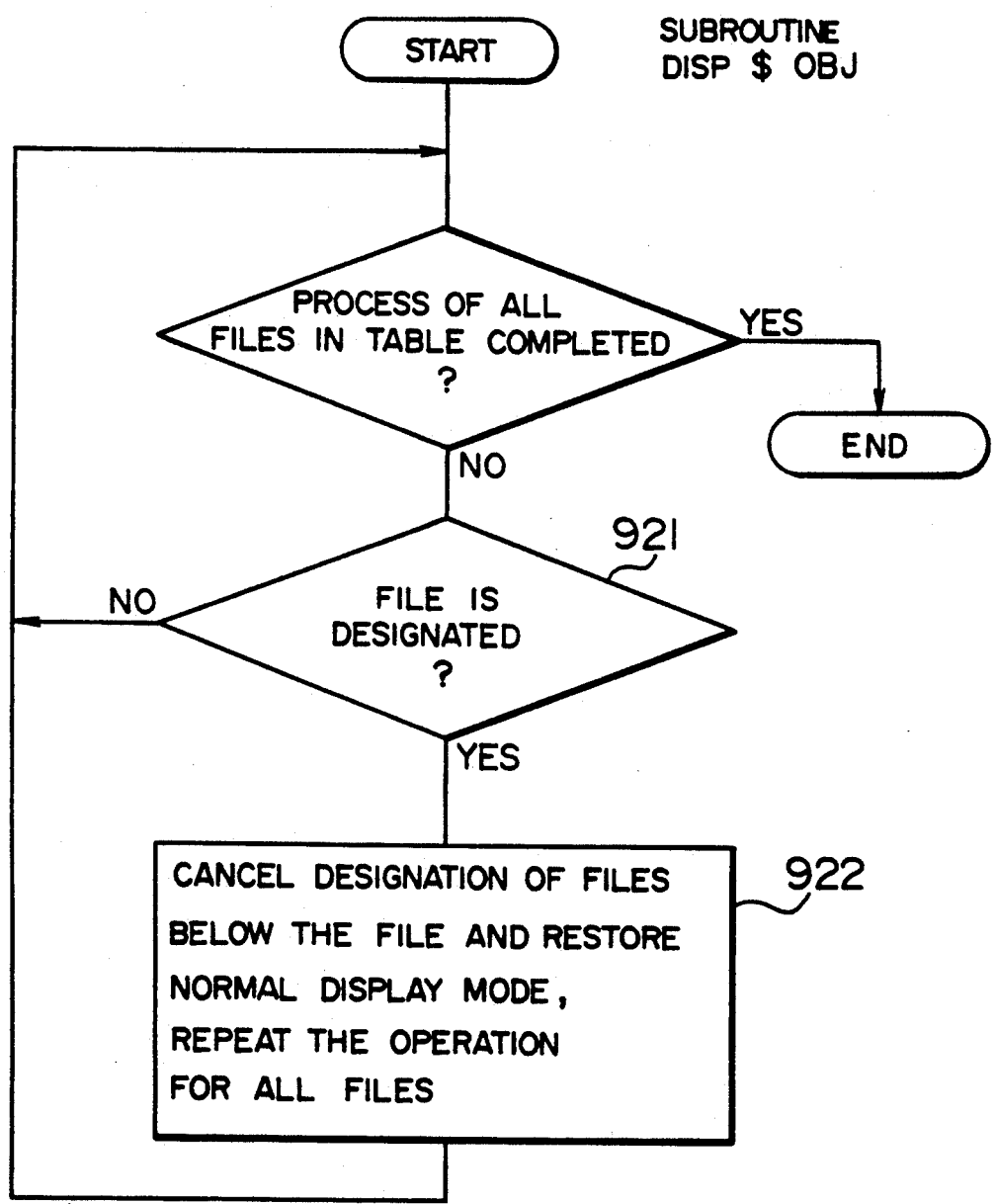

FIG. 24A

| NAME | TYPE | |
|---|---|---|
| FLOPPY | FLOPPY | |
|   TEXT 1. DAT | DATA FILE | |
|   HOLDER 01. DIR | DIRECTORY | |
|     TEXT 2. DIR | DATA FILE | ⌒211 |
| → HOLDER 02. DIR | DIRECTORY | REVERSE DISPLAY |
|     HOLDER 03. DIR | DIRECTORY | |
|       TEXT 3. DAT | DATA FILE | ⌒214 |
|       TEXT 2. DAT | DATA FILE | |
|     TEXT 5. DAT | DATA FILE | |
|   HOLDER 04. DIR | DIRECTORY | ⌒215 |
|   DICTIONARY DIC | DATA FILE | |

FIG. 24B

| NAME | TYPE |
|---|---|
| FLOPPY | FLOPPY |
|   TEXT 1. DAT | DATA FILE |
|   HOLDER 01. DIR | DIRECTORY |
|     TEXT 2. DAT | DATA FILE |
|   HOLDER 02. DIR | DIRECTORY |
|     HOLDER 03. DIR | DIRECTORY |
|       TEXT 3. DAT | DATA FILE |
|     TEXT 4. DAT | DATA FILE |
|     TEXT 5. DAT | DATA FILE |
|   HOLDER 04. DIR | DIRECTORY |
| → DICTIONARY DIC | DATA FILE |

REVERSE DISPLAY

F I G. 25

| NAME | TYPE | |
|---|---|---|
| FLOPPY | FLOPPY | |
|   TEXT 1. DAT | DATA FILE | |
|   HOLDER 01. DIR | DIRECTORY | REVERSE DISPLAY |
|     TEXT 2. DAT | DATA FILE | |
|   HOLDER 02. DIR | DIRECTORY | |
|     HOLDER 03. DIR | DIRECTORY | |
|       TEXT 3. DAT | DATA FILE | |
|       TEXT 4. DAT | DATA FILE | |
|     TEXT 5. DAT | DATA FILE | |
|   HOLDER 04. DIR | DIRECTORY | |
| → DICTIONARY. DIC | DATA FILE | |

METHOD AND APPARATUS FOR FILE OPERATION

BACKGROUND OF THE INVENTION

This invention relates to a file operation method for operating files stored in a storage unit of a computer or the like.

In conventional personal computers and word processors, texts created by the user are stored in the form of files in the internal storage unit (memory, hard disk, floppy disk, etc.) as shown JP-A-61-198360 filed on Feb. 28, 1985 by Tokyo Shibaura Electric Co., Ltd. Generally, files are stored in the storage unit by being grouped and organized on the basis of hierarchical structure. On this account, besides data files for storing data of texts and dictionaries, there exist specific files called "directories" for storing such information as file names of files in groups. Since directories can also be grouped as files, all files can be organized hierarchically.

Generally, it is possible for the user to copy or move files to another storage unit, delete files, change the name of files, and so on (these file operations will generically called "file operations" hereinafter). These file operations are mostly implemented in two operations which include designation of an object file (will be termed "object designation") and specification of the type of operation such as copy, move, etc. (will be termed "function specification"). The user takes these operations and thereafter responds to the prompt by the system, which depends on the function specification, to have another operation (e.g., the designation of destination for the copied or moved file). Some methods allow to designate a plurality of files in one operation so that the files are operated at once.

There are several methods for the object designation operation. For example, names of stored files or pictorial symbols of files (will be termed "icons") are displayed on the display unit, and the user is prompted to enter the file name or associated number, etc. through the keyboard or move the cursor onto the file name or icon by operating a pointing device such as a mouse or the cursor keys on the keyboard.

In many of the methods, when an exceptional event occurs during the process of a function specified by the user, a message is displayed thereby to inquire the user of a subsequent process to proceed. An example of exceptional events is the case in which a copy operation detects that a file with the same file name as that of the file to be copied already exists in the copy destination. The user's option against the inquiry on the above-mentioned exceptional event includes the abortion of the copy operation, copying the file after deleting the existing file, etc.

In the file operation mentioned above, the following problem will arise in case of operations for multiple files. Namely, during an operation for multiple files, if any exceptional event occurs in the process of one file, the system displays a message to inquire the user of the proceeding process. The system follows the user's response to proceed to the remaining process for the immediate file and the process for the remaining files. However, if the system inquiry accompanied by message display takes place frequently, the user will be busy in monitoring the message uninterruptedly in a state of readiness for response. Generally, the user has a multiple-file operation in expectation of less awkwardness than handling files individually. Therefore, a growing intricacy of the user's operation as in the above-mentioned case is conceived to be a significant problem.

Moreover, the hierarchical file system is not considered for the designation of object files at multiple levels among hierarchically organized files.

SUMMARY OF THE INVENTION

A first object of this invention is to provide a method and apparatus for file operation which does not impose an awkward operation on the user in designating multiple objects.

A second object of this invention is to provide an ability of designating multiple objects at different hierarchical levels.

The first object is achieved by a first method which is provided with the following means. The means includes a first means which specifies in advance a processing method for the occurrence of an exceptional event in expectation of its possibility in the future, and a second means which, at the occurrence of the exceptional event during the file operation, controls the process of the exceptional event in accordance with the processing method specified by the first means.

The above objective can also be achieved by a second method which is provided with the following means. The means includes a first means which, if an exceptional event occurs during a file process, holds the file process, a second means which, at the end of a process for storing such information as the file name of the file that has been held in the data table and the processes for all files other than the held file, specifies the processing method for the held file, and a third means which processes the held file in accordance with the processing method specified by the second means.

The first and second methods allow the user to have a single command entry for exceptional events, whereas conventionally the user needs to attend to each event occurrence, whereby the system operation is simplified.

The user's file operation based on this invention is accompanied by the behavior of the above-mentioned means and data table as follows.

In the first method, the system operates, after specifying the object designation and function specification, a message is displayed by the user on the display unit or the like by means of the first means, thereby to inquire the user of the processing method for exceptional events that are conceived to occur possibly in the future, and is ready to accept an input from a pointing device such as a keyboard or mouse. In response to the entry of instruction for the processing method by the user, the system commences the file process. During the file process, if an exceptional event occurs, the system operates on the second means to carry out the file process in accordance with the method which has been set in advance by the first means. This operation is implemented for all files designated as objects. In the case of designation of a single file, the inquiry of processing method to the user takes place at the event occurrence as in the conventional manner.

In the second method, the system commences the file process after the object designation and function specification by the user. If an exceptional event occurs, the system operates on the first means to hold the file process and store such information as the file name of that file in a data table. The system proceeds to the process for the next file. This operation is repeated for all files that have been designated as objects. On completion of process for all files, the system makes reference to the data table and, if any held file is left, operates on the second means to display the relevant message on the display unit or the like, thereby prompting the user to specify the processing method for the held file through such a pointing device as a keyboard or mouse. In response to the user's entry of instruction, the system operates on the third means to carry out the file process with reference to the data table in accordance with the processing method preset by the second means. This operation takes place for all files whose information is stored in the data table. In the case of designation of a single file, the inquiry of processing method to the user takes place at the event occurrence as in the conventional manner.

The second object intended for hierarchically organized files is achieved in such a manner that a table of hierarchical files is displayed and the user is allowed to designate multiple objects and confirm only effective process objects on the display screen.

According to this invention, the user is not involved in intricate procedures in the file operation with multiple file designation for objects. Therefore, it becomes possible to handle multiple files in a short time and to readily cope with exceptional events which can occur during the process. In addition, according to this invention, a single file can be handled in the same manner as the conventional manner, and file manipulation with well operationability can be accomplished. Moreover, for hierarchically organized files, multiple objects at different levels can be designated easily.

BRIEF DESCRIPTION OF THE DRAWINGS

FIGS. 1A and 1B are diagrams explaining the file operation method according to this invention;

FIGS. 4 to 6 are diagrams showing the control procedures of file operation based on this embodiment; and FIGS. 7 to 25 are diagrams pertinent to the designation of multiple objects at different levels of hierarchically organized files, in which:

FIG. 7 is a flowchart showing the processing procedure according to an embodiment of this invention;

FIG. 8 is a diagram showing an example of hierarchically organized files;

FIG. 9 is a diagram showing an example of main memory mapping;

FIG. 10 is a flowchart showing the processing procedure for a subroutine DISPLAY$FILES;

FIG. 11 is a flowchart showing the processing procedure for a subroutine READ$FILE$INF;

FIG. 12 is a flowchart showing the processing procedure for a subroutine DISPLAY;

FIG. 13 is a diagram showing a display screen for the table of files;

FIG. 14 is a flowchart showing the processing procedure for a subroutine APPOINT;

FIG. 15 is a flowchart showing the processing procedure for a subroutine CANCEL;

FIG. 16 is a flowchart showing the processing procedure for a subroutine UP$CURSOR;

FIG. 17 is a flowchart showing the processing procedure for a subroutine DOWN$CURSOR;

FIG. 18 is a flowchart showing the processing procedure for a subroutine DELETE;

FIGS. 19A and 19B are diagram showing display screens for object designation;

FIG. 20 is a flowchart showing the processing procedure according to an embodiment of this invention;

FIG. 21 is a flowchart showing the processing procedure for a subroutine APPOINT2;

FIG. 22 is a flowchart showing the processing procedure for a subroutine CANCEL2;

FIG. 23 is a flowchart showing the processing procedure for a subroutine DISP$OBJ;

FIGS. 24A and 24B are diagram showing display screens for object designation; and FIG. 25 is a diagram showing a display screen for the object of process.

DESCRIPTION OF THE PREFERRED EMBODIMENTS

Embodiments of this invention will be described with reference to the drawings.

Figure 2A:
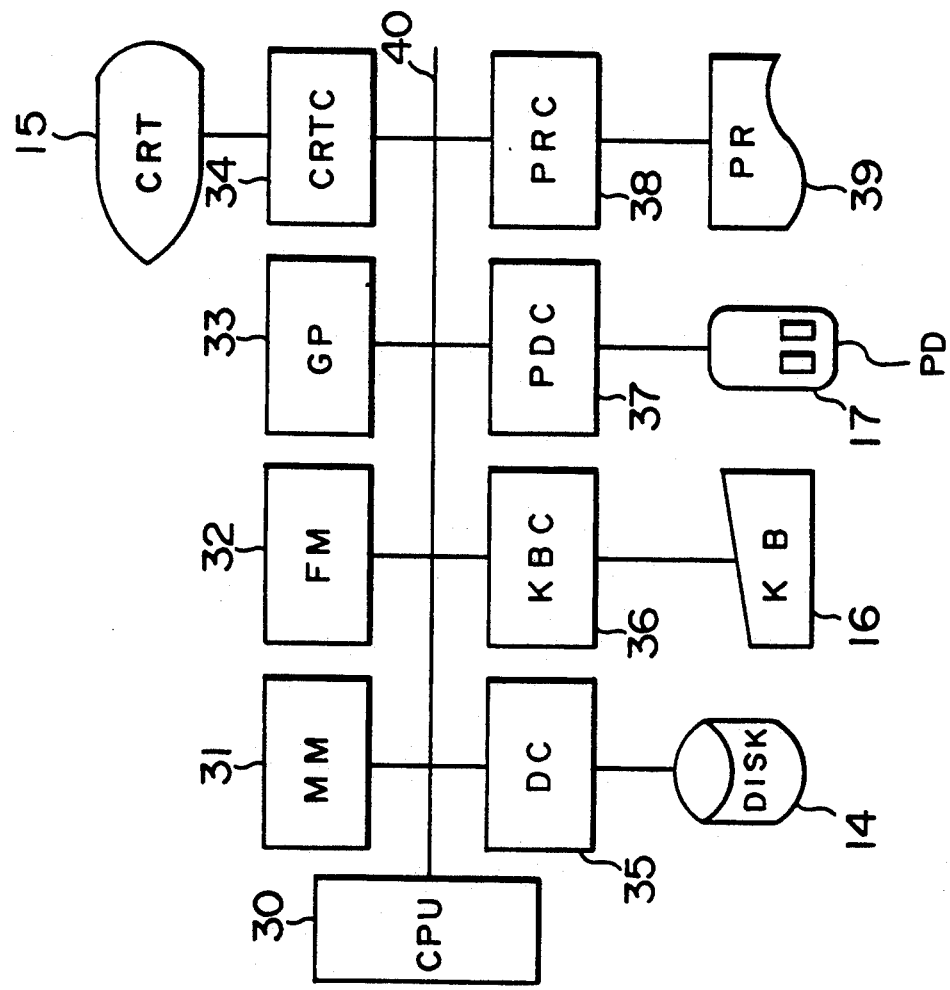
FIG. 2A is a block diagram of the computer system pertinent to this invention.
Figure 2B:
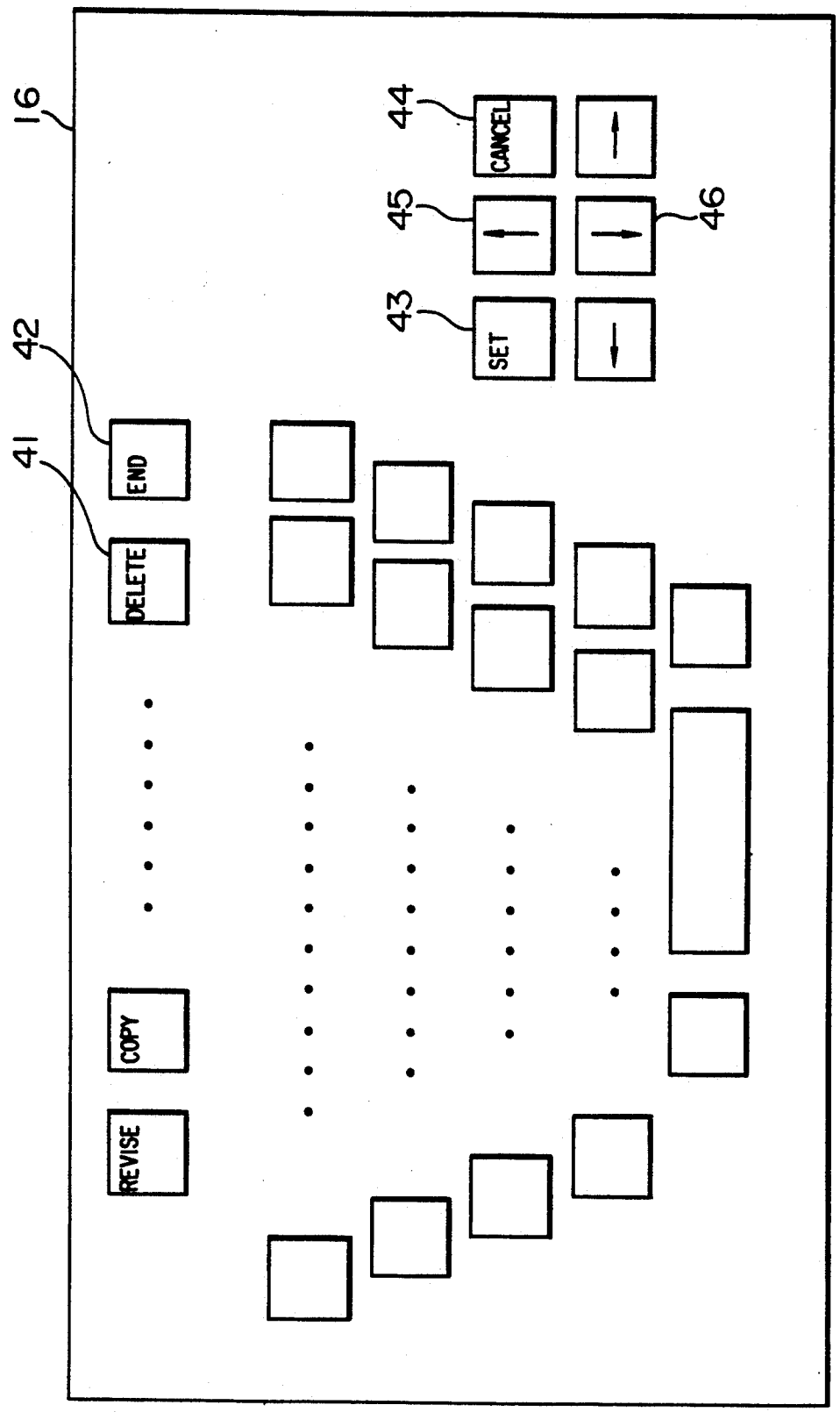
FIG. 2B is a diagram showing, as an example, the key assignments of the keyboard.

FIG. 2A shows the configuration of the inventive computer system which is applied to a word processor or personal computer. The system comprises a main processor (CPU) 30, a main memory (MM) 31, a display memory (FM) 32, a graphic processor (GP) 33, a display controller (CRTC) 34, a display unit (CRT) 15, a magnetic disk controller (DC) 35, a magnetic disk (DISK) 14, a keyboard controller (KBC) 36, a keyboard (KB) 16, a pointing device controller (PDC) 37, a pointing device (PD) 17 such as a mouse, a printer controller (PRC) 38, a printer (PR) 39, and a common bus 40. FIG. 2B shows the assignments of the keys used for the operation.

FIGS. 1A and 1B are diagrams explaining the processing method of file operation based on this invention. FIG. 1A explains the processing method of the file operation based on the first method of this invention. After the system has been started, a file operation program 1 initially runs an object designation routine 2. The object designation routine 2 searches the magnetic disk 14 for files stored in it. The routine displays a message on the display unit 15 so as to notify the user of the stored files, and it receives an input from the keyboard 16 or pointing device 17 for object designation taken by the user. The file operation program 1 proceeds to a function specification routine 3. The function specification routine 3 receives an input from the keyboard 16 or pointing device 17 for specifying a file operation to be done as entered by the user. Following the function specification, the file operation program 1 performs such a file operation process as a move process 4, copy process 5, delete process 6, or the like, prescribed by the function specification. The following explains the copy process 5.

The copy process 5 initially runs a multiple object designation test routine 7. The routine 7 detects whether more than one object has been designated, and it proceeds to an exception process specification routine 8 in case of multiple object designation. The routine 8 displays a message on the display unit 15 thereby to inquire the user of the processing method of exception, and it receives an input from the keyboard 16 or pointing device 17 for the specification of method taken by the user. Subsequently, the copy process 5 runs a file processing routine 9 for copying files stored in the magnetic disk 14. In step 10, the process tests the occurrence of exceptional event, and upon detecting an exceptional event it runs a routine of exception process control 11. The routine 11 performs an exception process 12 corresponding to the method specified previously by the user. Finally, the copy process 5 runs a routine 13 to check whether any designated file is left unprocessed yet. If an unprocessed file is detected, the program returns to the file process routine 9. In the case of the single object designation, as opposed to the multiple object designation, the multiple object designation test routine 7 operates to inquire the user of the processing method at the occurrence of an exceptional event during the file process, and therefore the exception process control routine 11 works properly in both cases of single and multiple object designation.

FIG. 1B explains the processing method of file operation based on the second method of this invention. The FIGURE shows only a portion corresponding to the copy process 5 in FIG. 1A, with remaining portions being identical to FIG. 1A. The copy process 18 initially runs a file process routine 19 for copying files. A subsequent routine 20 detects the occurrence of exceptional event, and upon detection it proceeds to a process holding routine 21. The routine 21 saves information on the file at a exceptional event in the data table 25, and then suspends the process for the file. Next, the copy process 18 runs a routine 22 to detect whether any of the designated files is left unprocessed yet. If an unprocessed file is detected, the program returns to the file process routine 19, or otherwise it runs a routine 23 for specifying the processing method for the held file. The routine 23 makes reference to the data table 25 to detect a held file, and upon detection it displays a message on the display unit 15 thereby to inquire the user of the processing method for the held file. On receiving an input from the keyboard 16 or pointing device 17 for the specification of method taken by the user, the program runs a held file processing routine 24. The routine 24 makes reference to the data table 25, and performs exception processes in compliance with the methods specified by the user in advance for all held files. In the case of the single object designation, as opposed to the multiple object designation, the held file processing method specification routine 23 operates to inquire the user of the processing method at the occurrence of exceptional event during the file process, and therefore the held file processing routine 24 works properly in both cases of single and multiple object designation.

Figure 3:
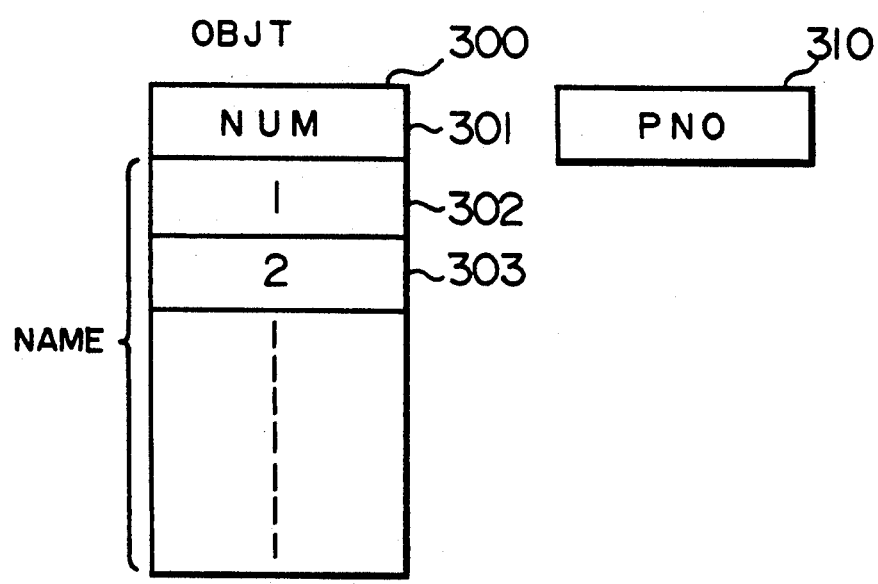
FIG. 3 is a diagram showing control data used in the file operation method of this embodiment.

FIG. 3 shows control data used in the multiple object designation test routine 7. The control data includes an object designation table (OBJT) 300 for controlling the designated object files and an exception process number field (PNO) 310 which contains a numeric code of processing method for an exceptional event specified by the user. The object designation table (OBJT) 300 contains the number of objects designated (NUM) 301, and the path names (NAME) 302 which indicate routes to the designated object files. The number of NAME 302 is equal to the number of objects which can be designated.

Figure 4:
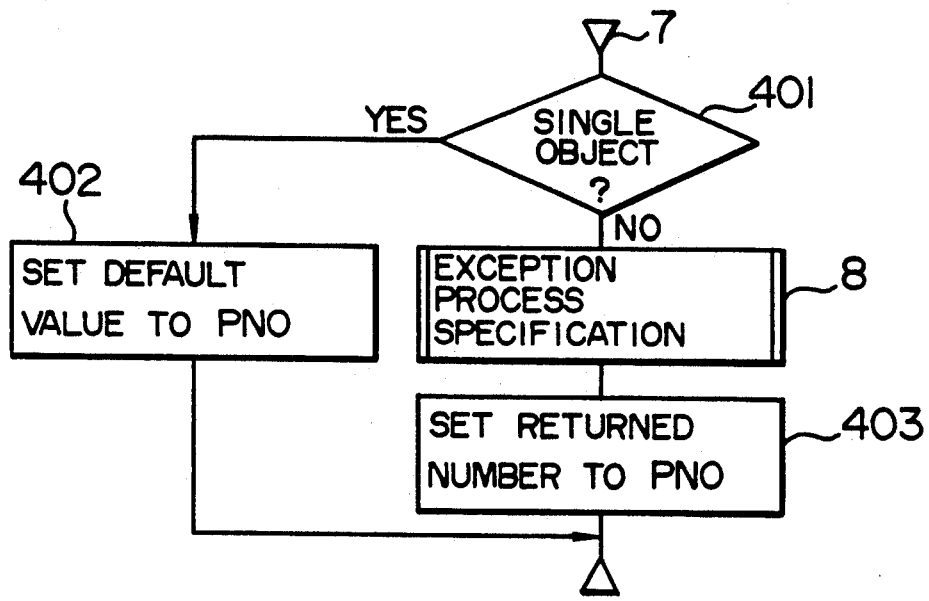
Figure 5:
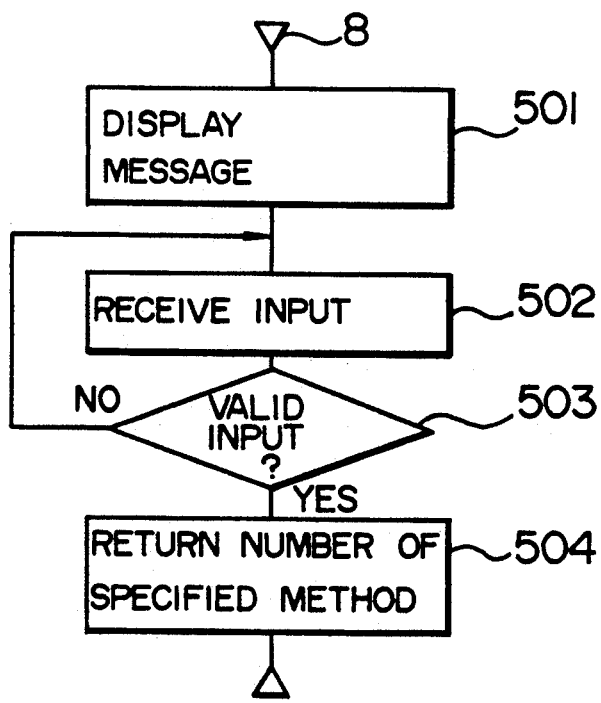

FIGS. 4 to 6 show the processing procedures pertinent to the control of file operation based on this invention. The following explains the processing procedure of the multiple object designation routine 7, exception process specification routine 8 and exception process control routine 11, with reference to FIG. 3 and FIGS. 4 to 6.

(I) Multiple Object Designation Test

FIG. 4 shows the processing procedure of the multiple object designation test routine 7. Step 401 makes reference to the NUM 301 in OBJT 300 to test whether the number of objects designated is one or more. In case of one object, the program proceeds to step 402, which sets the predetermined number (default value) for an exception process in the PNO 310 of the control data in FIG. 3. In case of multiple object designation, the exception process specification routine 8 is executed. The execution of the routine 8 is followed by a routine 403, which stores the numeric code of the specified exception process provided by the routine 8 into the PNO 310, with the intention of having the exception process later in accordance with the code number. The routine 7 terminates on completion of step 402 or step 403.

(II) Exception Process Specification

FIG. 5 shows the processing procedure of the exception process specification routine 8. The routine 8 returns a value to the main routine at the end of execution. Step 501 displays a message on the display unit 15 thereby to inquire the user of the processing method at the occurrence of exception. The next step 502 receives an input from the keyboard 16 or pointing device 17 for the specification of method given by the user. In response to the user's entry, the next step 503 tests whether the input is valid. An invalid input (erroneous input, etc.) causes the program to return to step 502. A valid input is followed by step 504, which generates a numeric code corresponding to the processing method entered by the user. Step 504 imparts the generated value to the main routine 7.

(III) Exception Process Control

FIG. 6 shows the processing procedure of the exception process control routine 600. Step 601 makes reference to the PNO 310 and executes an exception process 12 corresponding to the stored code number. On completion of the exception process 12, the routine 600 terminates the execution.

According to this embodiment, as described above, the user is not involved in an intricate operation at the file operation with multiple file designation, and single file designation can be handled in the same manner as the conventional manner, whereby the file operation with well operationability can be accomplished.

Figure 8:
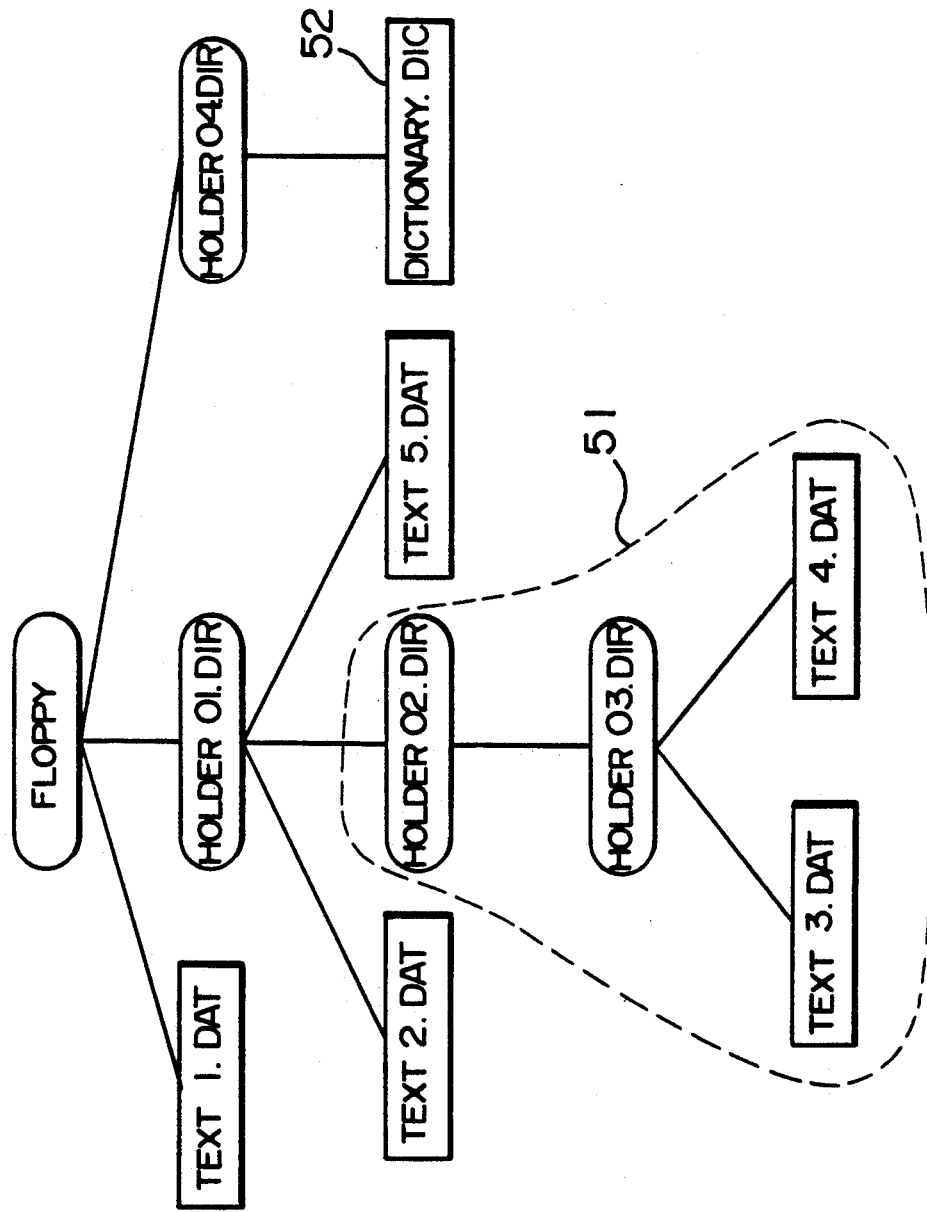

Next, an embodiment intended for multiple object designation at different levels of hierarchically organized files will be described. In handling a large number of files, it is convenient to store the files in purpose-based classification. The unit of storage is "directory", and each directory can contain subsidiary directories and text files or the like, as shown in FIG. 8.

In the following discussion, a term "holder" is used commonly to denote a directory, so that the user can easily distinguish between directories and data files. A data file is given a name which reflects its contents. A special directory is provided for the root of file structure, and it is named "floppy".

The main memory 31 has areas of CRS$POS for the cursor position, FILE$TBL for storing file information displayed on the screen, N$FILES indicative of the number of file information stored in the FILE$TBL, NUM$D indicative of the number of file information displayed on the screen, HEAD$D indicative of the top of displayed file information, and LAST$D indicative of the end of file information, as shown in FIG. 9. The FILE$TBL includes fields of the data file or directly name: NAME, the type of contents: KIND (1: data file, 10: directory, OFFH: other), and the attribute: LEVEL (hierarchical level: 0 for the highest level: with increment of 1 in depth), and the designation status: APNT (0: undesignated (can be designated), 1: designated (can be cancelled), 2: disabled designation and cancellation).

Figure 7:
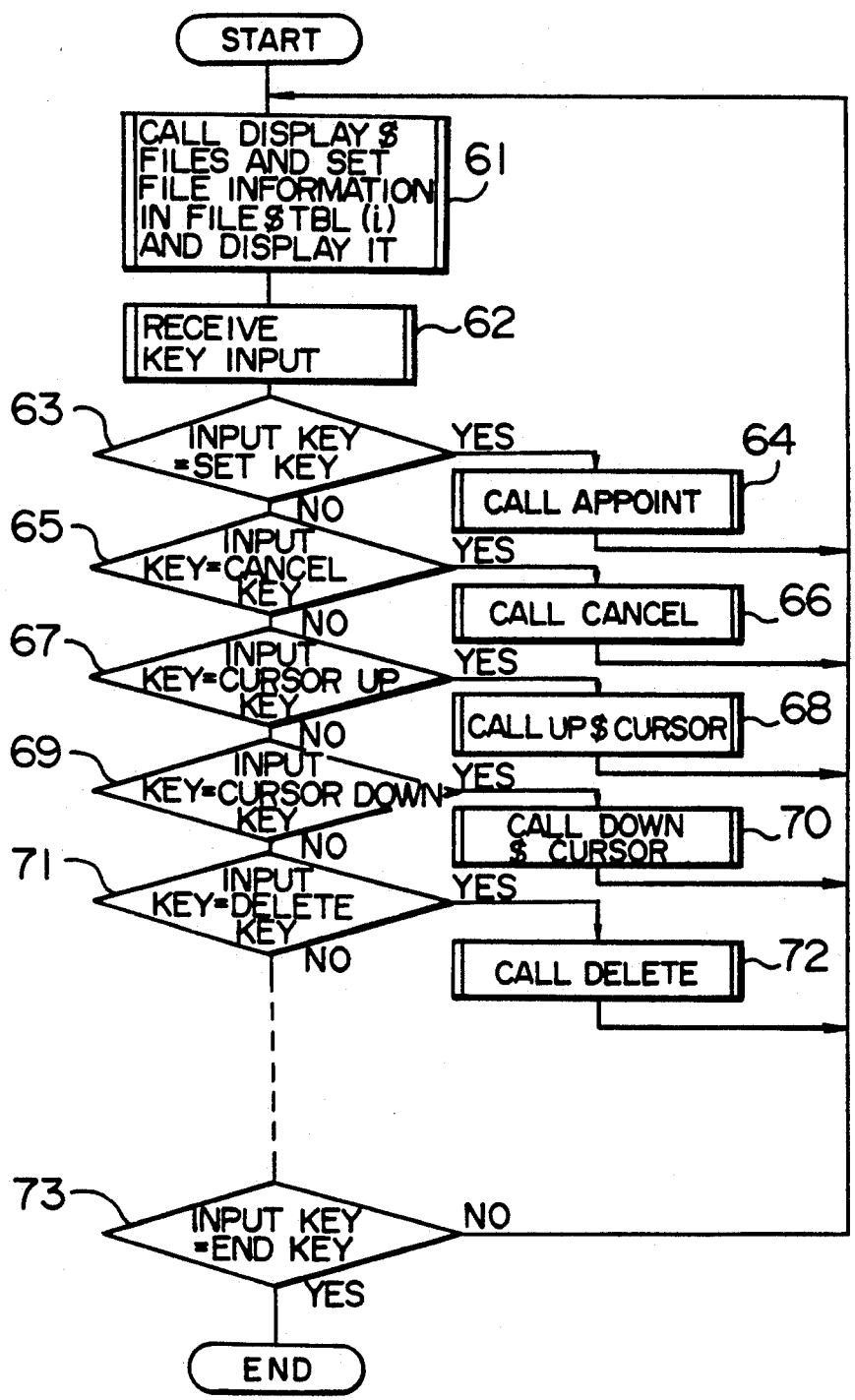

The following explains the operation of this embodiment by following the flowchart of FIG. 7.

Figures 10, 13:
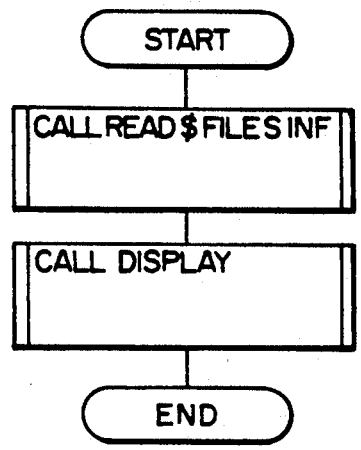

Initially, the system calls a subroutine DISPLAY$FILES shown in FIG. 10 so as to display a table of files (step 61). This subroutine calls a subroutine READ$FILE$INF for creating a file table shown in FIG. 11, and transfers file information in the directory 14 to FILE$TAB (i) (i=0, 1, ..., N$FILES-1).

The operation of the subroutine READ$FILES$INF shown in FIG. 11 will be explained. Initially, the "0"th term FILE$TBL(0) of the file table is created. The NAME, KIND and APNT of FILE$TBL(0) are key data representing the hierarchical file structure, and they are given as known data (step 101). By testing as to whether the search have been conducted for all hierarchical levels (step 102), if it is affirmed the subroutine terminates at END, or if it is denied the subroutine calls a file, which has not been accessed yet, at level 0 immediately below the file with NAME of FILE$TBL(0) (step 103). Next, the routine tests as to whether all files at the level in attention have been read and whether the preceding step has failed in accessing a file (step 104). If the test is affirmed the reading proceeds to the next higher level (step 105), or it is denied the routine sets data of the file accessed in step 103 in the file table to fill the NAME, LEVEL and APNT (step 106). The routine checks the type of data of the file (step 107), and sets "1" to KIND in case of a data file (step 108), or sets "10" to KIND in case of a directory, and then moves to the next lower level for the process (step 109). In this manner, the file table of FIG. 9 is completed.

Figure 12:
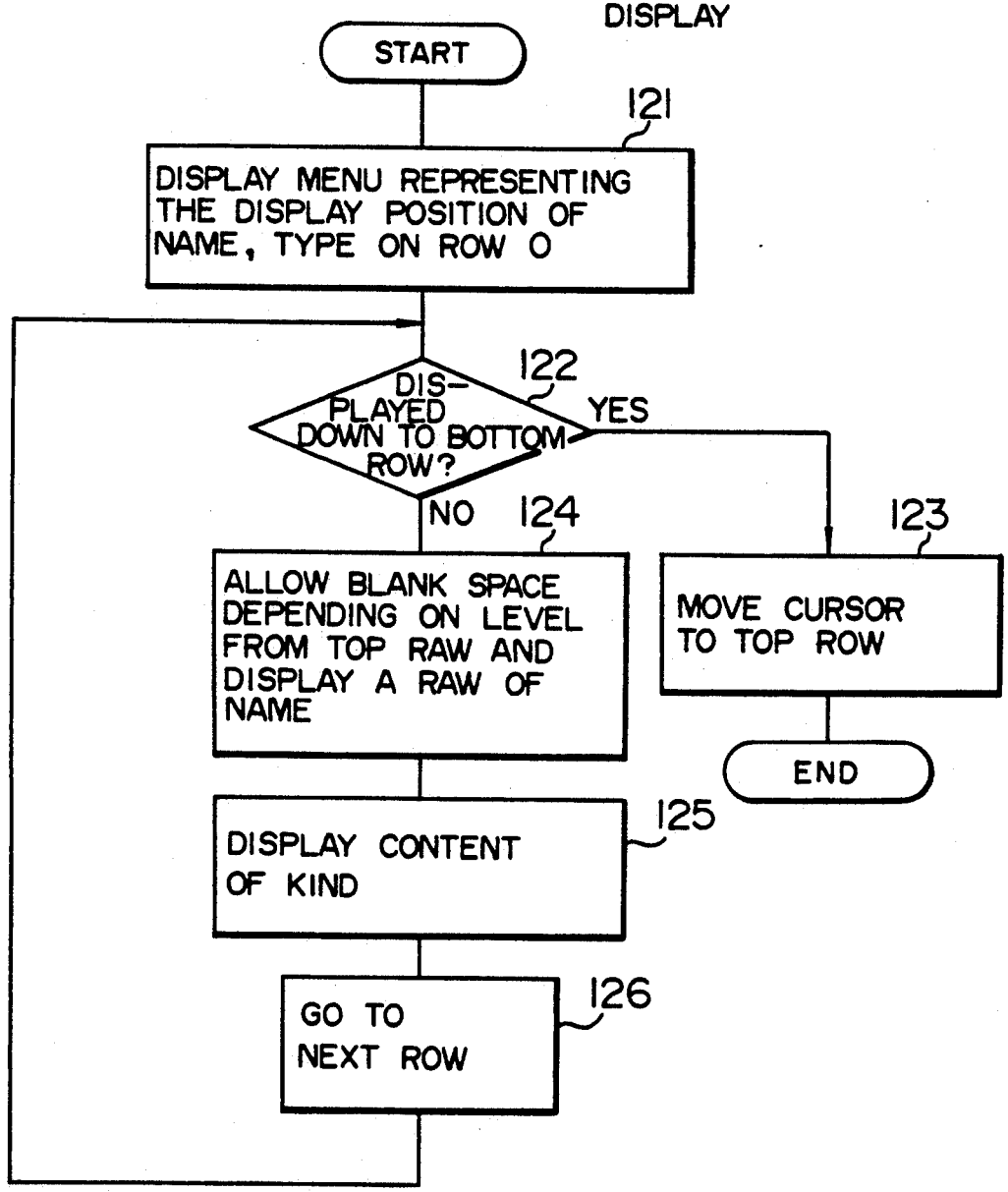

Next, the system calls a subroutine DISPLAY shown in FIG. 12 in accordance with the file information stored in the file table, and displays the file names and types, with the display position for NAME being set depending on its hierarchical level. The system also calls a menu of display position for the file name and type.

For example, in the case of a file structure shown in FIG. 8, file information is collected in the order of text1.DAT, holder01.DIR, text2.DAT, holder02.DIR, holder03.DIR, text3.DAT, text4.DAT, text5.DAT, holder04.DIR, and dictionary.DIC. The information is stored as shown in the column of NAME in FIG. 9, and files of all hierarchical levels are displayed as shown in FIG. 13.

The subroutine DISPLAY shown in FIG. 12 operates as follows. Initially, the routine displays a menu of display position for the file name and type on row 0 of the screen (step 121), then tests whether the screen has been displayed up to the bottom row (step 122). If the test is affirmed, the routine brings the cursor to the top row (step 123), or if denied, it makes a blank section in size depending on the depth of level from the top and displays a row of NAME (step 124). The routine displays the type in accordance with the KIND data (step 125). Subsequently, the routine proceeds to the display process for the next row (step 126).

After the table of files has been displayed, the routine receives a key entry (step 62). The routine responds to the entry of the "set" key 43 (step 63) to call a subroutine APPOINT shown in FIG. 14 and implements the object designation process (step 64). The routine responds to the entry of the "cancel" key 44 (step 65) to call a subroutine CANCEL shown in FIG. 15 and implements the designation cancellation process (step 66). The routine responds to the entry of the "up-pointing arrow" key 45 (step 67) to call a subroutine UP$CURSOR shown in FIG. 16 and moves the cursor one line upward (step 68).

The subroutine UP$CURSOR operates as follows. Initially, the routine turns off the cursor (step 161), then tests whether the cursor is located at the top row of the screen (step 162). If the test is denied, the routine raises the cursor position by one row (step 163), and turns on the cursor (step 164).

Figure 18:
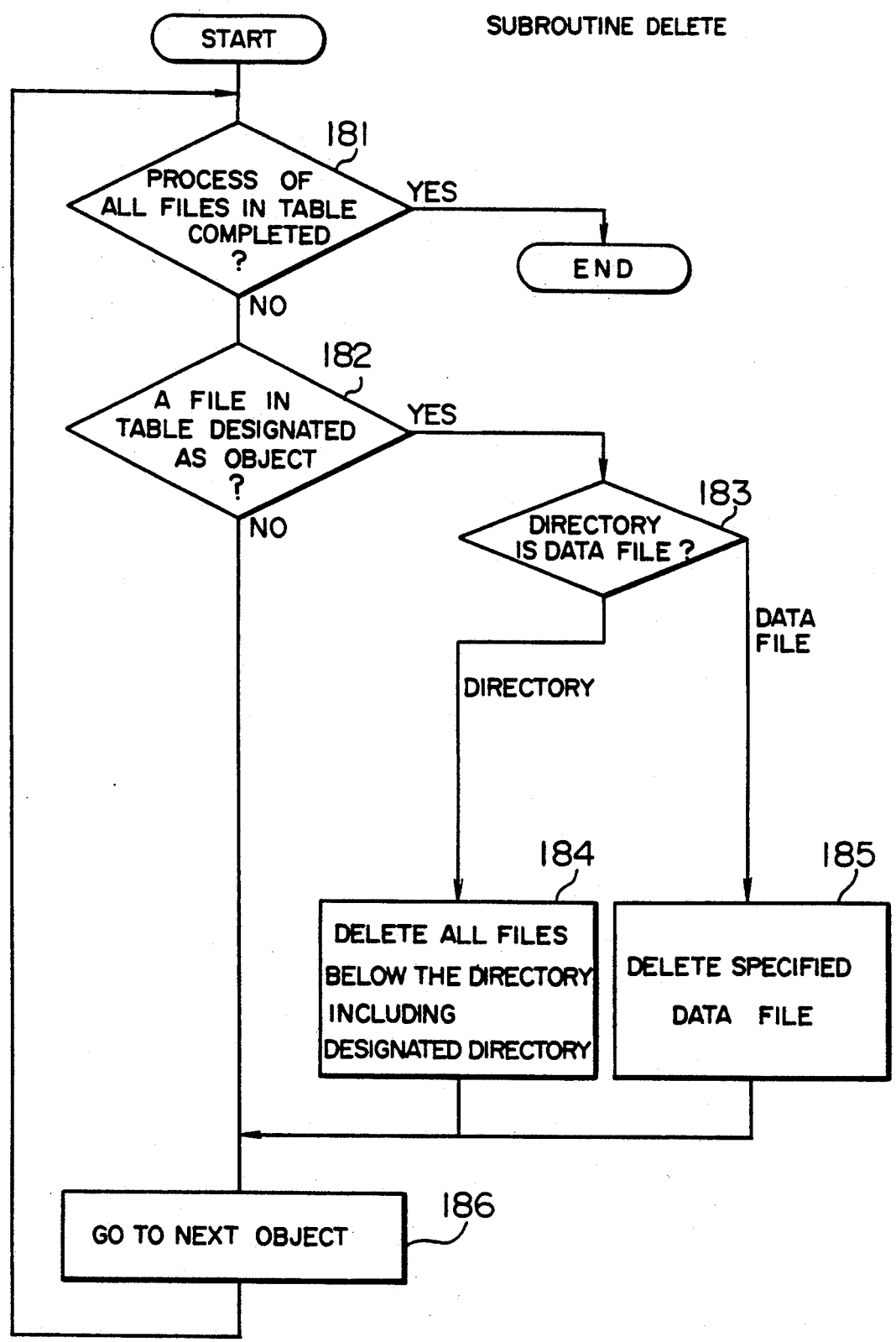

The routine responds to the entry of the "down-pointing arrow" key 46 (step 69) to call a subroutine DOWN$CURSOR shown in FIG. 18, and moves the cursor one row downward on the screen (step 70). The subroutine DOWN$CURSOR operates as follows. Initially, the routine turns off the cursor (step 171), and then tests whether the cursor is located on the bottom row (step 172). If the test is denied, the routine lowers the cursor position by one row (step 173), and turns on the cursor (step 174).

The setup and cancelling operations are performed for an object pointed by the cursor. In response to the entry of the "delete" key 41 (step 71), the routine implements the deletion process for the designated object (step 72). The routine responds to the entry of the "end" key 42 (step 73) to terminate the process.

The subroutine APPOINT for the object designation process initially tests whether the file pointed by the cursor can be designated (step 641), as shown in FIG. 14. If the test is denied, the routine terminates the process, or if it is affirmed, the routine enters the designated items (step 642) and displays the pertinent rows in reverse mode (step 643). Subsequently, the routine tests whether the type is directory (step 644). If the test is denied, the routine terminates the process, or if the type is found to be a directory, the routine disables the setup and cancellation for all files that belong to that directory and displays these rows in half-intensity mode (step 645).

Figure 15:
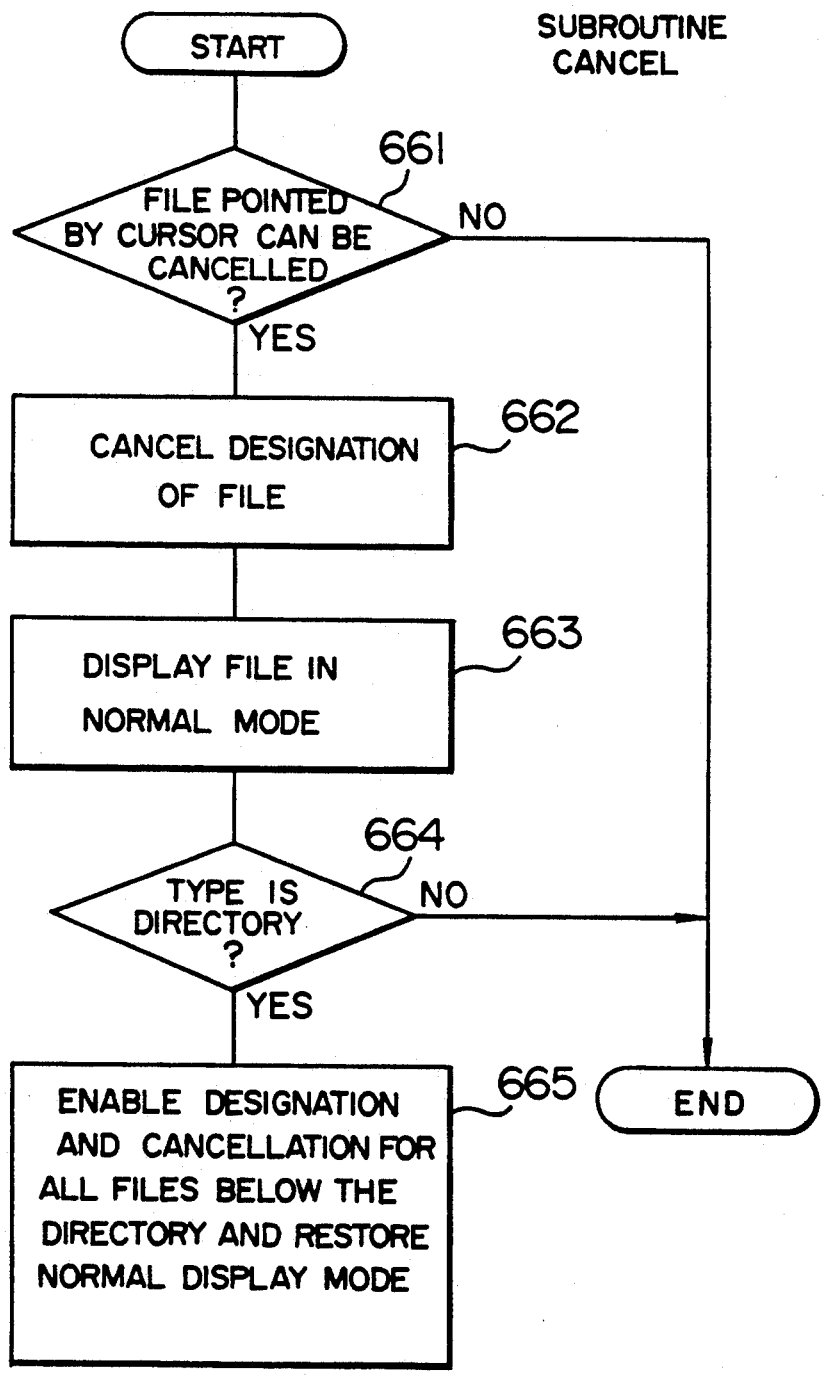
Figure 16:
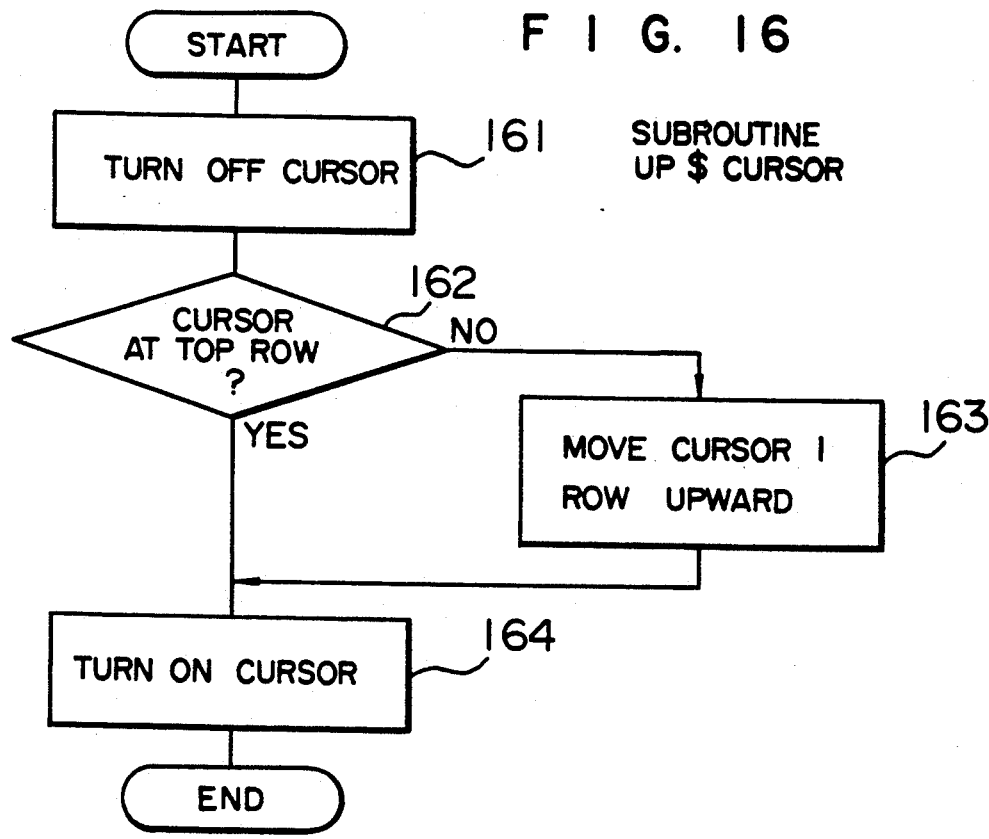

The subroutine CANCEL for cancelling the object designation initially tests whether the file pointed by the cursor can be cancelled (step 661), as shown in FIG. 15. If the test is denied, the routine terminates the process, or if cancellation if feasible, the routine cancels the designation of the file (step 662) and restores the normal display for that row (step 663). The routine next tests whether the type is directory (step 664). If the test is denied, the routine terminates the process, or if the type is a directory, the routine enables the cancellation for all files that belong to that directory and restores the normal display mode for these rows (step 665).

The subroutine DELETE for deleting a designated file operates as shown in the flowchart of FIG. 18. The routine tests the completion of process for all files registered on the table (step 181). If the test is affirmed, the routine terminates at END, or if it is denied, the routine tests for a file on the table whether it is designated as an object (step 182). If the test is affirmed, the routine tests whether the type is directory or data file (step 183). In case of a directory, the routine deletes all files that belong to the directory and the directory itself .,step 184), or in case of a data file, the routine deletes the data file (step 185). After that, the routine proceeds to the next object (step 186).

As an example of operation, in FIG. 13, when holder02.DIR 211 is specified, it is displayed in reverse mode as shown in FIG. 19A, and files 212 that belong to it, as shown by 51 in FIG. 8, are displayed in half-intensity mode as a status of disabled designation. When dictionary, DIC 213 in FIG. 19A is specified, it is displayed in reverse mode as shown in FIG. 19B. In this state, if the "delete" key is pressed, files below holder02.DIR and dictionary.DIC 52 in FIG. 8 are deleted.

In object designation at different hierarchical levels based on this embodiment, the specified object is displayed in reverse mode and all files associated with the object are displayed in half-intensity mode. If the reverse and half-intensity display functions were absent, the user would forget a previously specified object among numerous objects, and could vainly enter the same object again, whereas according to this embodiment, the user is prevented from taking such a vain action by being informed on the display screen that those below the designated object are rejected against duplicate designation.

Figure 20:
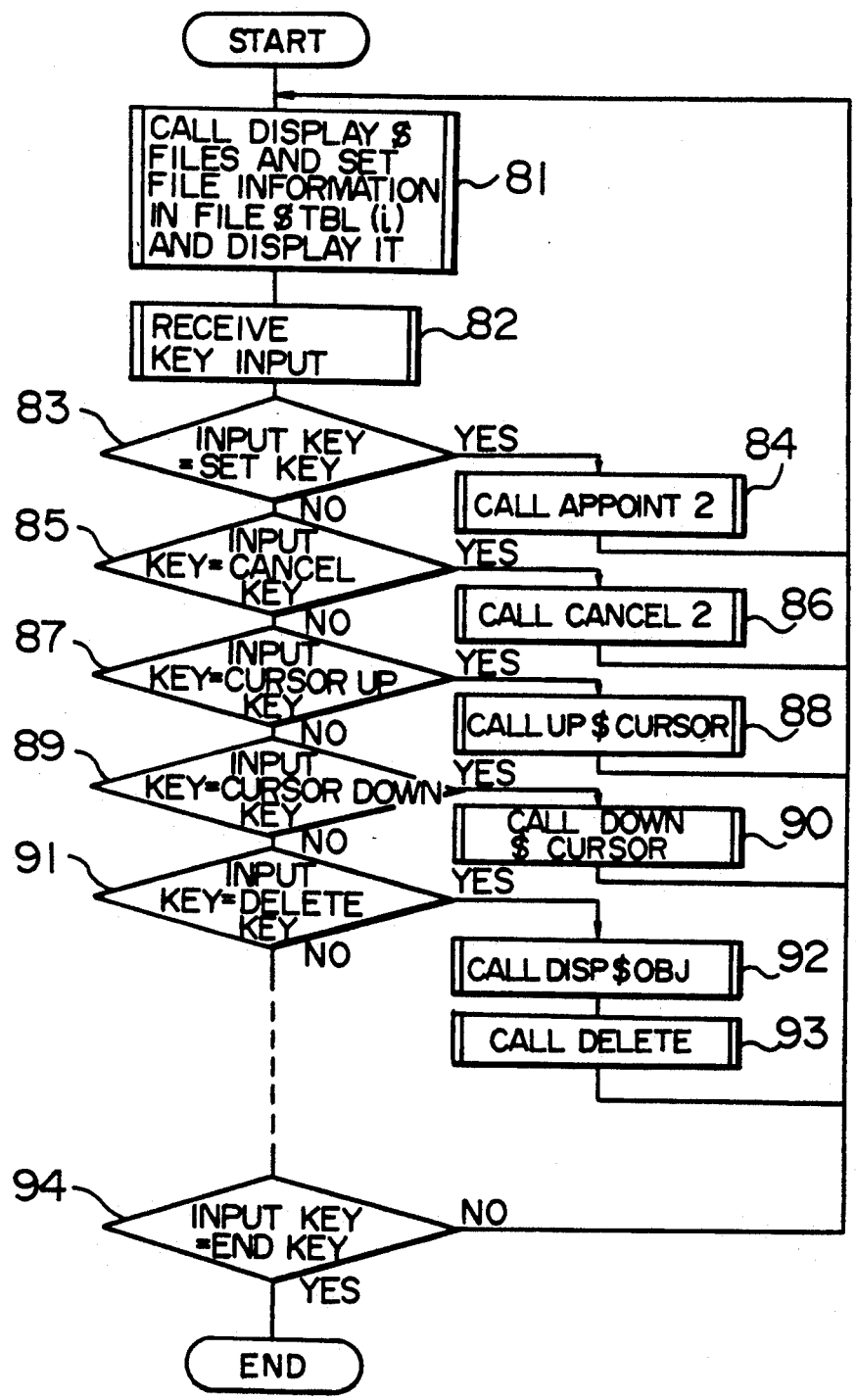

Another embodiment of this invention will be described on the flowchart of FIG. 20. This embodiment employs a display layout for the better intelligibility of process objects, in place of the half-intensity display mode.

Initially, the program calls the subroutine DISPLAY$FILES shown in FIG. 10 to store file information in the FILE$TBL(i), (i=0, 1, ..., N$FILES-1) and display the content on the screen (step 81).

Figure 17:
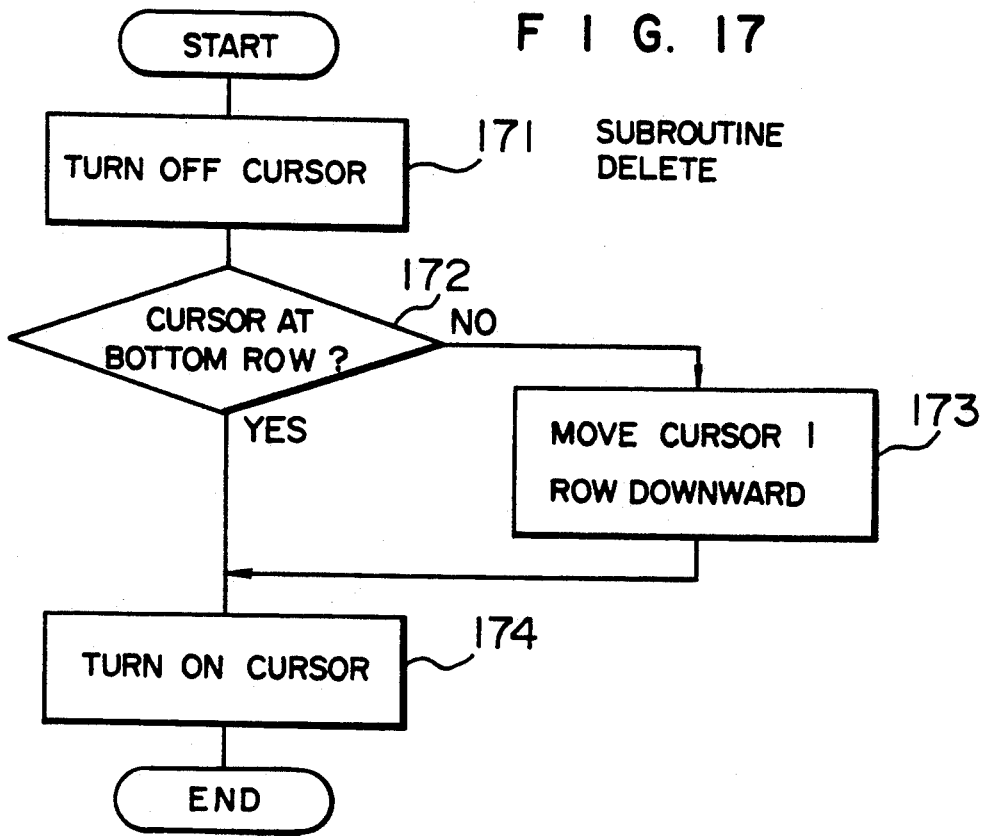

Next, the routine receives a key input (step 82). The routine responds to the entry of the "set" key (step 83) to call a subroutine APPOINT2 shown in FIG. 31 and implements the object designation process (step 84). The routine responds to the entry of the "cancel" key 44 (step 85) to call a subroutine CANCEL2 shown in FIG. 22 and implements the designation cancellation process (step 86). The routine responds to the entry of the "up-pointing arrow" key 45 (step 87) to call a subroutine UP$CURSOR shown in FIG. 16 and moves the cursor one row upward (step 88). The routine responds to the entry of the "down-pointing arrow" key 46 (step 89) to call a subroutine DOWN$CURSOR shown in FIG. 17, and moves the cursor one row downward on the screen (step 90). The setup and cancelling operations are performed for an object pointed by the cursor.

In response to the entry of the "delete" key 41 (step 91), the routine calls a subroutine DISP$OBJ shown in FIG. 23 to leave only minimal objects necessary for the execution of process (step 92), and then calls the subroutine DELETE shown in FIG. 18 to delete the specified object (step 93). The routine responds to the entry of the "end" key 42 (step 94) to terminate the process.

Figure 21:
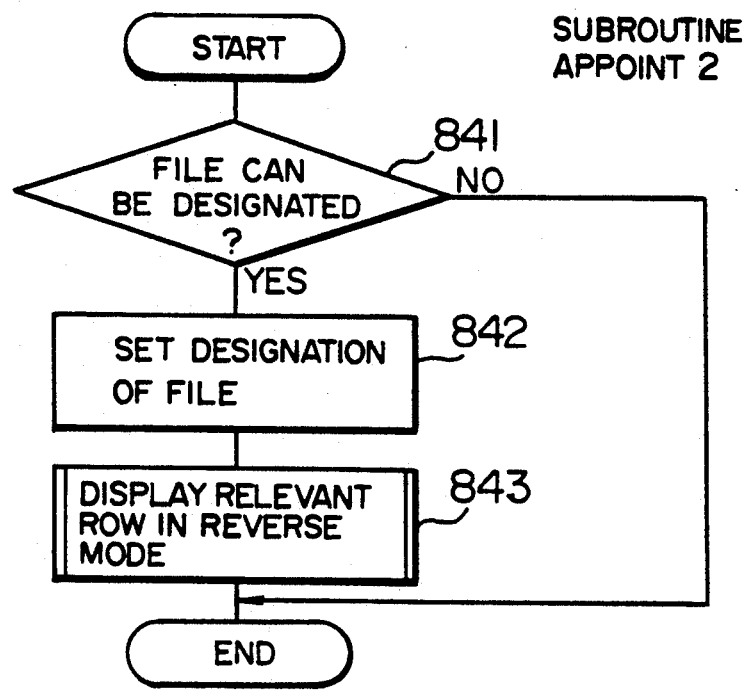

The subroutine APPOINT2 for the object designation process initially tests whether the file pointed by the cursor can be designated (step 841), as shown in FIG. 21. If the test is denied, the routine terminates the process, or if it is affirmed, the routine enters the designated items (step 842) and displays the pertinent rows in reverse mode (step 843).

Figure 22:
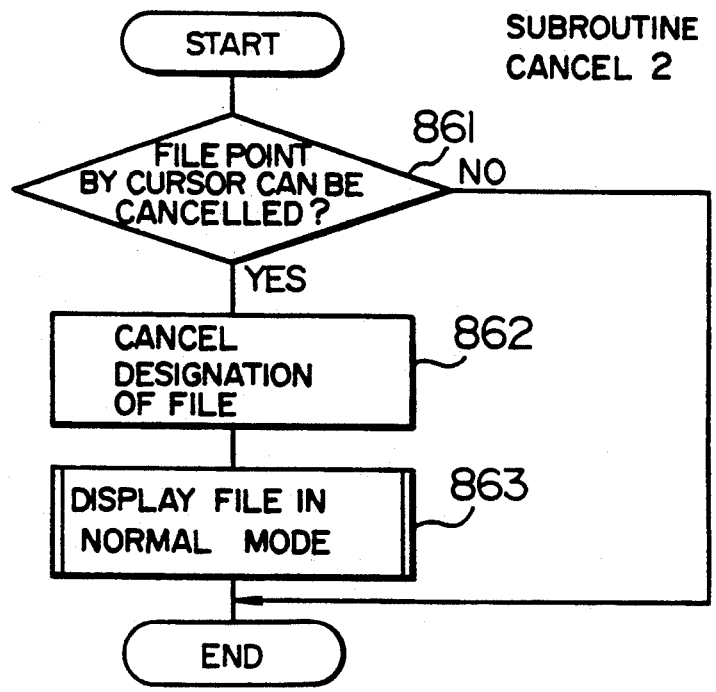

The subroutine CANCEL2 for cancelling the object designation initially tests whether the file pointed by the cursor can be cancelled (step 861), as shown in FIG. 22. If the test is denied, the routine terminates the process, or if cancellation if feasible, the routine cancels the designation of the file (step 862) and restores the normal display for that row (step 863).

The subroutine DISP$OBJ for leaving minimal objects necessary for the execution of process among the designated objects tests whether process of all files in table completed (step 920) and if it is not completed further tests whether a file is designated (step 921) as shown in FIG. 23, and if it is found designated the routine cancels the designation of items below that file and restores the normal display for them (step 922). This operation is repeated for all files.

As an example of operation, in FIG. 13, when holder02.DIR 211 is specified, it is displayed in reverse mode as shown in FIG. 24A. When dictionary.DIC 215 in FIG. 24A is specified, it is displayed in reverse mode as shown in FIG. 24B. In this state, if the "delete" key is pressed, text4.DAT whose row is displayed in reverse and is below the 211 is erased, and a frame of the actual process object shown in FIG. 25 is displayed. Files 51 and dictionary.DIC52 below the holder02.DIR in FIG. 8 are deleted. According to this embodiment, objects to be processed actually are displayed clearly and the enhanced intelligibility of process object is offered.

Next, other embodiments based on the combination of the first and second objectives of this invention will be described.

An embodiment which is designed to combine the first method and the half-intensity display method for hierarchically organized files operates in its program as follows. Each step of routine is the same as explained previously on the flowchart.

The program displays a list of hierarchically organized files at multiple levels on the display screen, and receives an entry of file designation through the keyboard 16 or pointing device 17. The designated file is displayed in reverse mode and files under the designated file are disabled for designation and cancellation and are displayed in half-intensity mode as shown in FIGS. 19A and 19B.

The user specifies the operation for the designated file, and subsequently enter the processing method for all expected exceptional events prior to the execution of file operation. At the occurrence of an exceptional event during the execution of file operation, the program deals with the file in accordance with the processing method which has been entered in advance.

An embodiment which is designed to combine the first method and the method of displaying only relevant files operates in its program as follows. The program displays a list of hierarchically organized files at multiple levels on the display screen, and receives an entry of file designation through the keyboard 16 or pointing device 17. The designated file is displayed in reverse mode as shown in FIGS. 24A and 24B. The user specifies the operation for the designated file, and subsequently enter the processing method for all expected exceptional events prior to the execution of file operation.

When the execution of file operation begins, only files relevant to the operation are displayed in reverse mode as shown in FIG. 25, and the operation for these files are carried out. At the occurrence of an exceptional event during the execution of file operation, the program deals with the file in accordance with the processing method which has been entered in advance.

An embodiment which is designed to combine the second method and the half-intensity display method for hierarchically organized files operates in its program as follows.

The program displays a list of hierarchically organized files at multiple levels on the display screen, and receives an entry of file designation through the keyboard 16 or pointing device 17. The designated file is displayed in reverse mode and files under the designated file are disabled for designation and cancellation and are displayed in half-intensity mode as shown in FIGS. 19A and 19B.

After the operation for the designated file has been specified, the program carries out the file operation. If an exceptional event arises during the file operation, the program holds the file operation and saves information pertinent to the file into the data table. On completion of all remaining file operation, the program inquires the user of the processing method for the held file.

An embodiment which is designed to combine the second method and the method of displaying only relevant files operates in its program as follows. The program displays a list of hierarchically organized files at multiple levels on the display screen, and receives an entry of file designation through the keyboard 16 or pointing device 17. The designated file is displayed in reverse mode as shown in FIGS. 24A and 24B. The user specifies the operation for the designated file. When the execution of file operation begins, only files relevant to the operation are displayed in reverse mode as shown in FIG. 25, and the operation for these files are carried out. If an exceptional event arises during the file operation, the program holds the file operation and saves information pertinent to the file into the data table. On completion of all remaining file operation, the program inquires the user of the processing method for the held file.

Although in all of the foregoing embodiments the designated file is displayed in reverse mode, it may be enclosed in a block, marked at the head of row, or underlined. Similarly, files under the designated file may be enclosed in a block, marked at the line head, or underlined, instead of being displayed in half-intensity mode.

The embodiments of this invention intended for hierarchically organized files can also be practiced by combining a function of displaying files at each hierarchical level individually with the object designation and cancellation. In this case, file names at the same hierarchical level are displayed first, and it is followed by the object designation and cancellation. Subsequently, file names at the next hierarchical level are displayed, and it is followed by the object designation and cancellation. These operations are repeated, and files at multiple hierarchical levels can be designated and cancelled. Exceptional events are dealt with by direct application of the first method and second method of this invention.

What is claimed is:

1. A method of file operation, in a computer system including an operation unit connected to a memory device, a display unit and an input unit, comprising the steps, performed by said computer system, of:
    designating a file as an object of a file operation;
    specifying a file operation for said designated file;
    specifying, prior to execution of said specified file operation, a processing method for an exceptional event which may occur during execution of said specified file operation;
    executing said specified file operation;
    detecting whether said exceptional event has occurred during execution of said specified file operation; and
    suspending execution of said specified file operation and in place thereof processing said designated file based on said specified processing method when occurrence of said exceptional event has been detected during execution of said specified file operation.

2. A method of file operation, in a computer system including an operation unit connected to a memory device, a display unit and an input unit, comprising the steps, performed by said computer system, of:
    (a) designating files as objects of file operations;
    (b) specifying file operations for said designated files;
    (c) executing one of said specified file operations;
    (d) detecting whether an exceptional event occurred during execution of said one specified file operation;
    (e) when occurrence of said exceptional event has been detected during execution of said one specified file operation, suspending execution of said one specified file operation and saving information of said one specified file operation in said memory device; and
    (f) upon completion of steps (c)-(e) for one of said specified file operations, requesting an operator to input information specifying a processing method for specified file operations for which execution thereof has been suspended based on said information saved in said memory device.

3. A method of file operation, in a computer system including an operation unit connected to a memory device, a display unit and an input unit, comprising the steps, performed by said computer system, of:
    displaying a list of hierarchically organized files having multiple levels on a display screen of said display unit;
    designating a file from among said hierarchically organized files as an object of file operation;
    displaying said designated file in a display mode different from a display mode for undesignated files of said hierarchically organized files;
    specifying a file operation for said designated file; and
    specifying, prior to execution of said specified file operation, a processing method for an exceptional event which may occur during execution of said specified file operation;
    executing said specified file operation;
    detecting whether said exceptional event has occurred during execution of said specified file operation; and
    suspending execution of said specified file operation and in place thereof processing said designated file based on said specified file operation when occurrence of said exceptional event has been detected during execution of said specified file operation.

4. A file operation method according to claim 3, wherein said displaying said designated file step comprises the steps, performed by said computer system, of:
    disabling designation of said designated file and cancelling designation for all files organized in said hierarchically organized files at a level below a level of said designated file; and
    displaying files, for which designation has been disabled and cancelled, in a display mode different from a display mode for other files.

5. A file operation method according to claim 4, wherein said displaying said designated file step further comprises the steps, performed by said computer system, of:

displaying said designated file in reverse mode; and
displaying files, for which designation has been disabled and cancelled, in a half-intensity display mode.

6. A file operation method according to claim 3, wherein said executing step comprises the steps, performed by said computer system, of:

in case where a low-order file organized at a level in said hierarchically organized files organized below a level of said designated file is designated, causing a display mode for said designated low-order file to be the same as a display mode for undesignated files so that only said designated file as an operational object is displayed in a different display mode than other files; and executing said specified file operation only for said designated file.

7. A method of file operation, in a computer system including an operation unit connected to a memory device, a display unit and an input unit, comprising the steps, performed by said computer system, of:

(a) displaying a list of hierarchically organized files having multiple levels on a display screen of said display unit;
(b) designating files from among said hierarchically organized files as objects of file operations;
(c) displaying said designated files in a display mode different from a display mode for undesignated files of said hierarchically organized files;
(d) specifying file operations for said designated files;
(e) executing one of said specified file operations;
(f) detecting whether an exceptional event occurred during execution of said one specified file operation;
(g) when occurrence of said exceptional event has been detected during execution of said one specified file operation, suspending execution of said one specified file operation and saving information of said one specified file operation in said memory device; and
(h) upon completion of steps (e)–(g) for all of said specified file operations, requesting an operator to input information specifying a processing method for specified file operations for which execution thereof has been suspended based on said information saved in said memory device.

8. A file operation method according to claim 7, wherein said displaying said designated files step comprises the steps, performed by said computer system, of:

disabling designation of said designated files and cancelling designation for all files of said hierarchically organized files organized into a level below a level of said designated files; and displaying files, for which designation has bene disabled and cancelled, in a display mode different from a display mode for other files.

9. A file operation method according to claim 8, wherein said displaying said designated files step further comprises, performed by said computer system, of:

displaying said designated files in reverse mode; and
displaying files, for which designation has been disabled and cancelled, in a half-intensity display mode.

10. A file operation method according to claim 7, wherein said executing step comprises the steps, performed by said computer system, of:

in case where a low-order file in said hierarchically organized files organized at a level below a level of said designated files is designated, causing a display mode for said designated low-order file to be the same as a display mode for undesignated files so that only said designated files as operational objects are displayed in a different display mode than other files; and executing said specified file operations only for said designated files.

11. An apparatus for file operation comprising:

first means for designating a file as an object of a file operation;
second means for specifying a file operation for said designated file;
third means for specifying, prior to execution of said specified file operation, a processing method for an exceptional event which may occur during execution of said specified file operation;
fourth means for executing said specified file operation;
fifth means for detecting whether said exceptional event occurred during execution of said specified file operation by said fourth means; and
sixth means for suspending execution of said specified file operation and in place thereof processing said designated file in accordance with said specified processing method when occurrence of said exceptional event has been detected during execution of said specified file operation.

12. An apparatus for file operation comprising:

first means for designating files as objects of file operations;
second means for specifying file operations for said designated files;
third means for executing each of said specified file operations;
fourth means for detecting whether an exceptional event occurred during execution of said each specified file operation;
fifth means for, when occurrence of said exceptional event has been detected during execution of said specified file operation, suspending execution of said each specified file operation and saving information of said each specified file operation in a memory device; and
sixth means for, upon completion of said executing, detection and suspending operations for all of said specified file operations, requesting an operator to input information specifying a processing method for specified file operations for which execution thereof has been suspended based on said information saved in said memory device.

13. An apparatus for file operation comprising:

first means for displaying a list of hierarchically organized files having multiple levels on a display screen;
second means for designating a file from among said hierarchically organized files as an object of file operation;
third means for displaying said designated file in a display mode different from a display mode for undesignated files of said hierarchically organized files;

fourth means for specifying a file operation for said designated file;

fifth means for specifying, prior to execution of said specified file operation, a processing method for an exceptional even which may occur during execution of said specified file operation;

sixth means for executing said specified file operation;

seventh means for detecting whether said exceptional event has occurred during execution of said specified file operation; and eighth means for suspending execution of said specified file operation and in place thereof processing said designated file based on said specified processing method when occurrence of said exception a event has been detected during execution of said specified file operation.

14. A file operation apparatus according to claim 13, wherein said third means comprises:

means for disabling designation of said designated file and cancelling designation for all files organized below said designated file; and means for displaying files, for which designation has been disabled and cancelled, in a display mode different from a display mode for other files.

15. A file operation apparatus according to claim 14, wherein said third means further comprises:

means for displaying a said designated file in reverse mode; and means for displaying files, for which designation has been disabled and cancelled, in a half-intensity display mode.

16. A file operation apparatus according to claim 13, wherein said sixth means comprises:

means for, in case where a low-order file in said hierarchically organized files organized at a level below said designated file is designated, causing a display mode for said designated low-order file to be the same as a display mode for undesignated files so that only said designated file as an operational object is displayed in a different display mode than other files; and means for execution said specified file operation only for said designated file.

17. An apparatus for file operation comprising:

first means for displaying a list of hierarchically organized files having multiple levels on a display second means for designating files from among said hierarchically organized files as objects of file operations;

third means for displaying aid designated files in a display mode different from a display mode for undesignated files of said hierarchically organized files;

fourth means for specifying file operations for said designated files;

fifth means for executing each of said file operations;

sixth means for detecting whether an exceptional event occurred during execution of said each specified file operation;

seventh means for, when occurrence of said exceptional event has been detected during execution of said each specified file operation, suspending execution of said each specified file operation and saving information of said each specified file operation, in a memory device; and eighth means for, upon completion of said executing, detecting and suspending operations for all of said specified file operations, and requesting an operator to input information specifying a processing method for specified file operations for which execution thereof has been suspended based on said information saved in said memory device.

18. A file operation apparatus according to claim 17, wherein said third means comprises:

means for disabling designation of said designated files and cancelling designation for all files in said hierarchically organized files organized at a level below a level of said designated files; and means for displaying files, for which designation has bene disabled and cancelled, in a display mode different form a display mode for other files.

19. A file operation apparatus according to claim 18, wherein said third means further comprises:

means for displaying said designated files in reverse mode; and means for displaying files, for which designation has been disabled and cancelled, in a half-intensity display mode.

20. A file operation apparatus according to claim 19, wherein said fifth means comprises:

means for, in case where a low-order file in said hierarchically organized files organized at a level below a level of said designated files is designated causing a display mode for said designated low-order file to be the same as a display mode for undesignated files so that only said designated files as operational objects are displayed in a different display mode than other files; and means for executing said specified file operations only for said designated files.

* * * * *